United States Patent
Nakamura et al.

(10) Patent No.: US 9,375,676 B2
(45) Date of Patent: Jun. 28, 2016

(54) METHOD OF RECOVERING CARBON DIOXIDE AND RECOVERY APPARATUS

(75) Inventors: Shiko Nakamura, Tokyo (JP); Tomoya Muramoto, Tokyo (JP); Yuichi Nishiyama, Tokyo (JP); Shinya Okuno, Tokyo (JP)

(73) Assignee: IHI Corporation, Tokyo (JP)

( * ) Notice: Subject to any disclaimer, the term of this patent is extended or adjusted under 35 U.S.C. 154(b) by 253 days.

(21) Appl. No.: 13/981,387

(22) PCT Filed: Jan. 17, 2012

(86) PCT No.: PCT/JP2012/050788
§ 371 (c)(1),
(2), (4) Date: Jul. 24, 2013

(87) PCT Pub. No.: WO2012/102124
PCT Pub. Date: Aug. 2, 2012

(65) Prior Publication Data
US 2013/0305924 A1    Nov. 21, 2013

(30) Foreign Application Priority Data
Jan. 27, 2011    (JP) .................. 2011-015125

(51) Int. Cl.
*B01D 53/14*    (2006.01)
(52) U.S. Cl.
CPC ........ *B01D 53/1425* (2013.01); *B01D 53/1475* (2013.01); *Y02C 10/06* (2013.01)
(58) Field of Classification Search
CPC ........... B01D 53/1425; B01D 53/1475; B01D 53/06; Y02C 10/00
USPC ...................... 95/162, 166; 96/242
See application file for complete search history.

(56) References Cited

U.S. PATENT DOCUMENTS

| 2,886,405 | A | 5/1959 | Benson et al. |
| 3,563,695 | A | 2/1971 | Benson |

(Continued)

FOREIGN PATENT DOCUMENTS

| JP | 54 155172 | 12/1979 |
| JP | 2005 230808 | 9/2005 |

(Continued)

OTHER PUBLICATIONS

Extended European Search Report issued Aug. 21, 2014, in Patent Application No. 12738924.5.

(Continued)

*Primary Examiner* — Duane Smith
*Assistant Examiner* — Cabrena Holecek
(74) *Attorney, Agent, or Firm* — Oblon, McClelland, Maier & Neustadt, L.L.P.

(57) ABSTRACT

A recovery apparatus of carbon dioxide includes: an absorption column contacting a carbon dioxide-containing gas into contact with an absorbing liquid and allowing the absorbing liquid to absorb carbon dioxide; a regeneration column for regenerating the absorbing liquid to release carbon dioxide; a circulation system which circulates the absorbing liquid to flow from the absorption column and return to the absorption column through the regeneration column; and a steam supply system which generates steam available for a heat source that regenerates the absorbing liquid, using the absorbing liquid that returns to the absorption column and/or the absorbing liquid in the absorption column, and supplies the steam to the regeneration column. High temperature steam is generated from the absorbing liquid and is provided to the regeneration column to use as a heat source for regenerating the absorbing liquid.

14 Claims, 2 Drawing Sheets

(56) References Cited

U.S. PATENT DOCUMENTS

| | | | |
|---|---|---|---|
| 3,725,529 | A | 4/1973 | Giammarco et al. |
| 4,035,166 | A | 7/1977 | Van Hecke |
| 4,112,050 | A * | 9/1978 | Sartori ............... B01D 53/1475 252/189 |
| 4,160,810 | A | 7/1979 | Benson et al. |
| 5,145,658 | A * | 9/1992 | Chao .................. B01D 53/1425 422/168 |
| 5,435,977 | A * | 7/1995 | Chao .................. B01D 53/1425 422/171 |
| 5,766,412 | A * | 6/1998 | Railey ..................... B01D 1/22 159/24.3 |
| 2007/0053817 | A1 | 3/2007 | Iijima et al. |
| 2008/0317651 | A1 | 12/2008 | Hooper et al. |
| 2010/0242731 | A1 | 9/2010 | Baburao et al. |
| 2011/0079504 | A1* | 4/2011 | Govindan ............... B01D 1/14 203/11 |
| 2011/0158891 | A1 | 6/2011 | Nagayasu et al. |

FOREIGN PATENT DOCUMENTS

| | | |
|---|---|---|
| JP | 2005 254212 | 9/2005 |
| JP | 2007 061777 | 3/2007 |
| JP | 2007 222847 | 9/2007 |
| JP | 2009 214089 | 9/2009 |
| JP | 2011 136258 | 7/2011 |
| WO | WO 2009/035340 A1 | 3/2009 |

OTHER PUBLICATIONS

U.S. Appl. No. 14/473,617, filed Aug. 29, 2014, Nakamura, et al.
International Search Report Issued Feb. 21, 2012 in PCT/JP12/050789 Filed Jan. 17, 2012.
U.S. Appl. No. 14/248,764, filed Apr. 9, 2014, Nakamura, et al.

* cited by examiner

METHOD OF RECOVERING CARBON DIOXIDE AND RECOVERY APPARATUS

TECHNICAL FIELD

The present invention relates to a method of recovering carbon dioxide and a recovery apparatus of carbon dioxide that separates and recovers carbon dioxide from a gas containing carbon dioxide such as a combustion gas, and returns a clean gas into the air.

BACKGROUND ART

In facilities such as a thermal power station, an ironworks, and a boiler, a large amount of fuel such as coal, heavy oil, and extra heavy oil is used. In regard to sulfur oxide, nitrogen oxide, and carbon dioxide discharged by burning of the fuel, quantitative/concentration restriction on emissions has been required from the viewpoint of prevention of air pollution and global environmental protection. In recent years, carbon dioxide has been viewed as a problem as is a major contributor to global warming, and moves to suppress carbon dioxide emissions have been active worldwide. Therefore, various studies have been vigorously progressed in order to enable recovery/storage of carbon dioxide of a combustion exhaust gas or a process exhaust gas instead of emitting carbon dioxide in the air, and, for example, a PSA (pressure swing) method, a membrane separation concentration method, a chemical absorption technique using reaction absorption with a basic compound have been known as a method of recovering carbon dioxide.

In the chemical absorption technique, a basic compound that typically belongs to alkanolamines is used as an absorber. In the process of the chemical absorption technique, generally, with having an aqueous liquid containing the absorber as an absorbing liquid, the absorbing liquid is circulated by alternately repeating an absorption step of causing the absorbing liquid to absorb carbon dioxide included in the gas and a regeneration step of regenerating the absorbing liquid by causing the absorbing liquid to release the absorbed carbon dioxide (for example, see Patent Literature 1 described below). In the regeneration step, heating for releasing carbon dioxide is necessary, and, in order to reduce the operation cost of carbon dioxide recovery, it becomes important to reduce energy required for heating/cooling. In Patent Literature 1 described below, it is configured such that thermal energy is recovered from the recovery gas, using a heat exchanger provided at a passage of the gas recovered from the regeneration step, and that it is supplied to the regeneration step.

Further, for the purpose of reducing energy required in recovering carbon dioxide from the absorbing liquid, Patent Literature 2 described below uses, for the heating of the absorbing liquid, remaining heat of steam-condensed water that is generated from a regeneration heater for performing heat exchange between the absorbing liquid and high-temperature steam by drawing the absorbing liquid from the regeneration step. Further, Patent Literature 3 described below discloses that a stripping gas is introduced so as to be accompanied with carbon dioxide, in order to facilitate releasing of the absorbed carbon dioxide.

CITATION LIST

Patent Literature

[PTL 1] JP 2009-214089 A
[PTL 2] JP 2005-254212 A
[PTL 3] JP 2005-230808 A

SUMMARY OF INVENTION

Technical Problem

The energy required in the regeneration step includes sensible heat required for raising the temperature of the absorbing liquid, heat of reaction in releasing carbon dioxide from the absorbing liquid, and latent heat for supplementing a heat loss due to water evaporation of the absorbing liquid. The above-described prior arts are technologies related to the sensible heat or the heat of reaction, and there is a room for improvement in energy efficiency.

To promote recovery of carbon dioxide for environmental protection, it is desirable from an economic perspective to reduce the cost required for recovery by enhancing energy efficiency to a maximum extent. Enhancement of recovery efficiency of thermal energy from the absorbing liquid is important in terms of energy saving, and it may also effectively act on recovery efficiency of carbon dioxide.

An object of the present invention is to provide a method of recovering carbon dioxide and a recovery apparatus capable of reducing an operation cost by reducing the energy required for regenerating the absorbing liquid.

Further, another object of the present invention is to provide a method of recovering carbon dioxide and a recovery apparatus that are capable of reducing the recovery cost of carbon dioxide by reducing the energy required for regenerating the absorbing liquid, without a burden on devices and complicated operations.

Solution to Problem

To solve the above problems, the inventors have continuously carried out diligent studies, resulting in finding that steam obtained by vaporizing water in the absorbing liquid can be used as a heat supply source at the time of regeneration, and that it makes possible to improve thermal energy efficiency by recovery/reuse of waste heat energy of the absorbing liquid, and in reaching completion of the present invention that is also a useful technique for liquid temperature control of the absorbing liquid.

According to an aspect of the present invention, a recovery apparatus of carbon dioxide comprises: an absorption column configured to bring a gas containing carbon dioxide into contact with an absorbing liquid and to allow the absorbing liquid to absorb carbon dioxide; a regeneration column for regenerating the absorbing liquid, configured to cause the absorbing liquid having carbon dioxide absorbed in the absorption column to release carbon dioxide; a circulation system configured to circulate the absorbing liquid in such a manner that the absorbing liquid flow from the absorption column and return to the absorption column through the regeneration column; and a steam supply system configured to generate steam available for a heat source that regenerates the absorbing liquid, using at least one of the absorbing liquid that returns to the absorption column by the circulation system and the absorbing liquid in the absorption column, and to supply the steam to the regeneration column.

Further, according to an aspect of the present invention, a method of recovering carbon dioxide comprises: an absorption step of bringing a gas containing carbon dioxide into contact with an absorbing liquid and causing the absorbing liquid to absorb carbon dioxide; a regeneration step of causing the absorbing liquid having carbon dioxide absorbed in the absorption step to release carbon dioxide, to regenerate the absorbing liquid; a circulation step of circulating the absorbing liquid in such a manner that the absorbing liquid flows from the absorption step and returns to the absorption step through the regeneration step; and a steam-supply step of generating steam available for a heat source that regenerates the absorbing liquid, using at least one of the absorbing liquid that returns to the absorption step by the circulation step and the absorbing liquid in the absorption step, and to supply the steam to the regeneration step.

Advantageous Effects of Invention

According to the present invention, in the process of recovering carbon dioxide contained in a gas, the energy supply required for regeneration of an absorbing liquid can be reduced and a cost required for operation can be reduced. Further, the present invention can contribute to improvement of the recovery efficiency of carbon dioxide in the absorbing liquid, and it can therefore provide a recovery apparatus of carbon dioxide capable of contributing to energy saving and environmental protection.

DESCRIPTION OF EMBODIMENTS

In general, as a technique for regenerating an absorbing liquid by causing the absorbing liquid to release carbon dioxide, heat of reaction is supplied by heating the absorbing liquid. This also requires supply of sensible heat required for raising the temperature of the absorbing liquid and latent heat for supplementing for a heat loss due to water vaporization of the absorbing liquid, and as a heat source of the sensible heat and the latent heat, vapor or the like is supplied from the outside of the carbon dioxide recovery apparatus.

In the present invention, steam is generated using waste heat inside the carbon dioxide recovery apparatus, and the steam is prepared in a state where it can serve as a supply source of thermal energy necessary for regeneration of the absorbing liquid. That is, the steam is adjusted to have a high temperature that is equal to or more than a regeneration temperature of the absorbing liquid, and is supplied to the regeneration column. When supplied, the high-temperature steam is diffused upward, and heat is also conducted upward. Therefore, it is the most efficient way to supply the steam to the lowermost portion of the area where the absorbing liquid to be regenerated is subjected to a vapor-liquid contact (the area where the regeneration progresses). Further, recovery of remaining heat and cooling of the absorbing liquid are also possible by generating the steam to be supplied to the absorbing liquid to be regenerated, from the absorbing liquid having remaining heat. Since the absorbing liquid that has lost vaporization heat due to the generation of steam has a decrease in temperature, the absorbing liquid after the generation of the steam is favorable to flow back to the absorption step. That is, the generation of steam is used as a cooling means for the absorbing liquid just before flowing back to the absorption step. The heat recovery from the absorbing liquid by the generation of steam is also possible from the absorbing liquid in the middle of the absorption step, and heat generated by absorption reaction of carbon dioxide is possibly recovered to generate the steam to be supplied to the regeneration step.

Hereinafter, a method of recovering carbon dioxide and a recovery apparatus of the present invention will be described with reference to the drawings.

Figure 1:
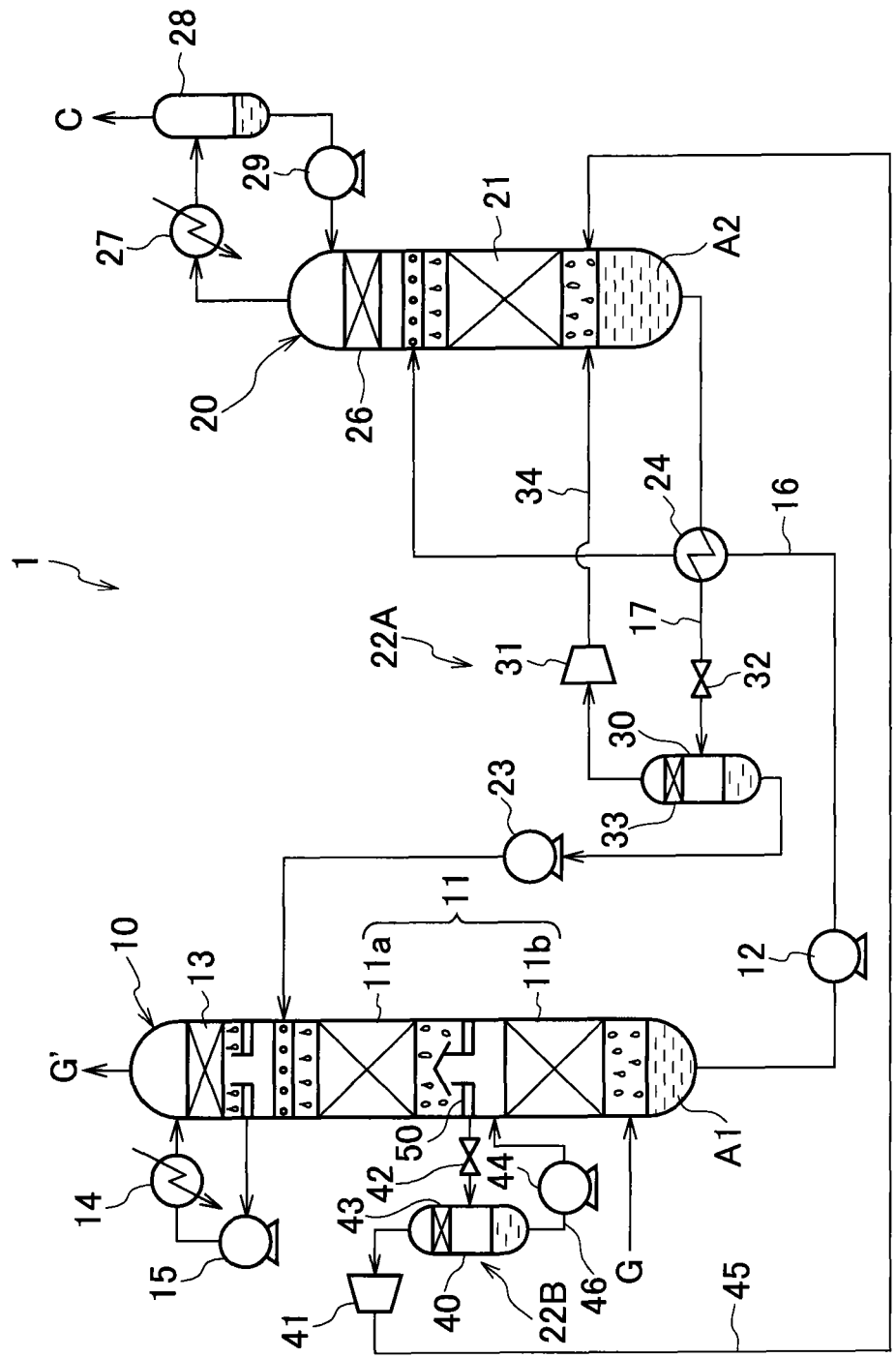
FIG. 1 is a schematic configuration diagram showing a recovery apparatus of carbon dioxide according to the first embodiment of the present invention.

FIG. 1 illustrates the first embodiment of the method of recovering carbon dioxide and the recovery apparatus that implements the method of the present invention. A recovery apparatus 1 comprises an absorption column 10 that brings a gas G containing carbon dioxide into contact with an absorbing liquid to cause the absorbing liquid to absorb carbon dioxide, and a regeneration column 20 that causes the absorbing liquid having absorbed carbon dioxide to release carbon dioxide and regenerates the absorbing liquid. Both of the absorption column 10 and the regeneration column 20 are configured as countercurrent-type vapor-liquid contact apparatuses, and respectively hold, in their interiors, filling materials 11 and 21 for making the contact areas larger. The filling material 11 of the absorption column 10 includes an upper filling material 11$a$ and a lower filling material 11$b$, and is configured such that the absorbing liquid during the absorption of carbon dioxide is possibly taken out of the absorption column 10. The filling materials 11 and 21 are typically made of, but are not limited to, a ferrous metal material such as stainless steel, carbon steel or the like. Any material having durability and corrosion resistance in a treating temperature, and having a shape capable of providing a desired contact area may be properly selected. As the absorbing liquid, an aqueous liquid containing, as an absorber, a compound that has an affinity for carbon dioxide such as alkanolamines is used.

The gas G containing carbon dioxide is supplied from a lower portion of the absorption column 10, and the absorbing liquid is supplied from an upper portion of the absorption column 10. The gas G and the absorbing liquid are subjected to vapor-liquid contact while passing through the filling material 11, and carbon dioxide in the gas G is absorbed in the absorbing liquid. The gas G supplied to the absorption column 10 has no specific limitation, and various gasses such as combustion exhaust gas and process exhaust gas can be handled. To have a low temperature suitable for absorption of carbon dioxide is favorable for it, and pretreatment equipment for cooling the gas can be attached as necessity arises.

The absorbing liquid A1 that has absorbed carbon dioxide is accumulated in the bottom portion of the absorption column 10, and is supplied to the regeneration column 20 by a pump 12 through a supply passage 16 that connects the bottom portion of the absorption column 10 and an upper portion of the regeneration column 20. A gas G', from which carbon dioxide has been removed, is discharged from the top portion of the absorption column 10. Since absorption of carbon dioxide by the absorbing liquid generates heat to raise the liquid temperature, a cooling condensation section 13 for removing steam and the like that may be contained in the gas G' can be optionally provided at the top portion of the absorption column 10, so that leakage of steam and the like out of the column can be suppressed with this section. To further secure the suppression, a cooler 14 attached outside the absorption column and a pump 15 that circulates a part of condensed water (it may contain the gas G' in the column) between the cooler 14 and the pump 15 are provided. Accordingly, the condensed water and the like, being cooled in the cooler 14 and supplied to the column top portion, keeps the cooling condensation section 13 at a low temperature, and reliably cools the gas G' that passes through the cooling condensation section 13. Also, a compositional variation of the absorbing liquid in the column is compensated by the condensed water flowing back to the filling material 11. The temperature of the gas G' discharged out of the column is favorably 60° C. or less. More favorably, the gas G' is cooled so that the temperature becomes 45° C. or less. Although the cooler 14 of this embodiment is a water-cooled system, other cooling system may be employed, and a refrigerating cycle with a refrigerant may be used so that cooling reliability is enhanced.

The absorbing liquid A1 that has absorbed carbon dioxide in the absorption column 10 is supplied to the upper portion of the regeneration column 20, which flows down the filling material 21 and is accumulated in the bottom portion. In the present invention, the recovery apparatus 1 has a steam supply system, that is including steam generators 22A and 22B, which generates steam that can be used as a heat source for regenerating the absorbing liquid in the regeneration column 20, with use of at least one of (in this embodiment, both of) the absorbing liquid A2 before returning to the absorption column 10 and the absorbing liquid situated in the absorption column 10, and which supplies the generated steam to the regeneration column 20. The steam generator 22A causes the absorbing liquid A2 just before flowing back to the absorption column 10 to generate steam, and the steam generator 22B uses the absorbing liquid situated in the absorption column 10 to generate the steam. High-temperature vapors supplied from the steam generators 22A and 22B are introduced to the bottom portion of the regeneration column 20 (details of the steam generation will be described below). The vapors are supplied in the vicinity of the liquid surface of the absorbing liquid A2 accumulated in the bottom portion of the regeneration column 20, and they provide heat to the filling material 21 above the liquid surface and to the absorbing liquid flowing down along the filling material 21, that causes the absorbing liquid to release carbon dioxide by the vapor-liquid contact on the filling material 21.

The absorbing liquid A2 that has released carbon dioxide and has been regenerated in the regeneration column 20 flows back to the absorption column 10 through a return passage 17 by a pump 23, while the absorbing liquid A2 passes through a heat exchanger 24 and the steam generator 22A. By heat exchange in the heat exchanger 24, heat of the absorbing liquid A2 in the return passage 17 is transferred to the absorbing liquid Al flowing in the supply passage 16 to raise the temperature, and the absorbing liquid A2 in the return passage 17 is cooled. Moreover, the absorbing liquid in the return passage 17 is further cooled in the steam generator 22A by a loss of vaporization heat due to the steam generation, and flows back to the absorption column 10. The absorbing liquid A2 that has flown back to the absorption column 10 generates heat by absorption of carbon dioxide while flowing down the filling material 11. However, when the absorbing liquid A2 dripped down from the upper filling material 11a, it is temporarily withdrawn and supplied to the steam generator 22B. After being cooled by the generation of steam in the steam generator 22B, the absorbing liquid is returned above the lower filling material 11b and further absorbs carbon dioxide.

A gas containing carbon dioxide released in the regeneration column 20 passes through a condensation section 26 at the upper portion of the regeneration column 20 and is discharged from the top portion as a recovery gas. The condensation section 26 condenses steam included in the recovery gas and suppresses its excessive discharging, and also suppresses discharging of the absorber. The recovery gas is sufficiently cooled by a cooler 27 using coolant water so as to condense the included steam to a maximum extent, and is recovered as a gas that has the recovered carbon dioxide C after the condensed water is removed by a vapor-liquid separator 28. The recovered carbon dioxide can be subjected to carbon dioxide fixation and re-organification in the ground by infusing it in the ground or in an oil field. The condensed water separated in the vapor-liquid separator 28 flows back to the upper portion of the regeneration column 20 by a pump 29. The condensed water flowed back to the column 20 is useful for cooling the condensation section 26 and suppressing discharge of the absorber and the like, and it is capable of compensating the compositional variation of the absorbing liquid in the column.

Hereinafter, the steam generators 22A and 22B used in the present invention will be described in detail.

The steam generator 22A is provided on the return passage 17 that connects the downstream of the regeneration column 20 and the upstream of the absorption column 10, and generates high-temperature steam, using residual heat of the absorbing liquid A2 remained after the decreasing in temperature at passing through the heat exchanger 24. That is, the warm fever of the absorbing liquid A2 is recovered and is reused as a steam. Specifically, the steam generator 22A includes a tank 30 for generating a steam by depressurizing the absorbing liquid A2 and a compression device 31 that compresses the steam generated in the tank 30 to raise the temperature, and the absorbing liquid in the return passage 17 is supplied to the middle portion of the tank 30 via a control valve 32 and is discharged from the bottom portion of the tank 30 by the pump 23. When an inside of the tank 30 is subjected to a negative pressure by driving of the compression device 31 connected to the top portion of the tank 30, the absorbing liquid A2 is depressurized by being introduced through the control valve 32, and generates a steam in the tank 30 due to drop of the boiling temperature while it loses vaporization heat and is cooled. The steam generated in the tank 30 in a depressurized state passes through a demister 33 disposed at an upper portion in the tank 30, by which mist is removed, and is sent to the compression device 31 through a passage 34 that connects the top portion of the tank 30 and the bottom portion of the regeneration column 20. The steam is pressurized in the compression device 31 to have an increase in temperature by compression heat, and is then supplied to the bottom portion of the regeneration column 20.

The steam generator 22B attached to the absorption column 10 generates a high-temperature steam, using the absorbing liquid that has absorbed carbon dioxide to have an increase in temperature. That is, heat of reaction in the absorbing liquid is recovered and reused as the steam. At the same time, the absorbing liquid loses the vaporization heat and has a decrease in temperature, and this makes easier for the absorbing liquid to further absorb carbon dioxide. More specifically, the steam generator 22B includes a tank 40 for generating steam by depressurizing the absorbing liquid, and a compression device 41 that compresses the steam generated in the tank 40 to raise the temperature. The passage 46 is connected in such a manner that the absorbing liquid accumulated in a reservoir 50 disposed between the filling materials 11a and 11b is supplied to the middle portion of the tank 40 via a control valve 42, and that it turns from the bottom portion of the tank 40 to the absorption column 10 by a pump 44. The absorbing liquid that has flown down the upper filling material 11a and that is in the middle of absorbing carbon dioxide is accumulated in the reservoir 50, and it is introduced via the control valve 42 to the tank 40 subjected to a negative pressure by driving of the compression device 41 and the pump 44, thereby the absorbing liquid is depressurized. The absorbing liquid that has generated steam in the tank 40 due to decrease of the boiling temperature loses vaporization heat and is cooled to the vicinity of the boiling temperature, and it flows back to the lower filling material 11b of the absorption column 10 through the passage 46, to further absorbs carbon dioxide. Since carbon dioxide that may be released from the depressurized absorbing liquid in the tank 40 is little, all of carbon dioxide absorbed by the absorbing liquid in the absorption column 10 is substantially supplied to the regeneration column 20 from the supply passage 16. The steam generated in the tank 40 with the boiling temperature passes through a demister 43 disposed at the upper portion of the tank 40, while mist is removed from the steam. The steam is then sent out to the compression device 41 through a passage 45 that connects the top portion of the tank 40 and the regeneration column 20, and is pressurized. After an increase in temperature by compression heat, the steam is supplied to the bottom portion of the regeneration column 20. It is favorable to heat an area from the upper portion of the tank 40 to the compression device 41 so that the vapor around the boiling temperature can be prevented from being condensed.

In the above configuration, the type of the control valves 32 and 42 has no specific limitation as long as the flow rate can be regulated, and can be appropriately selected as needed. The tanks 30 and 40 have no specific limitation as long as one has resistance to the absorbing liquid and pressure resistance, and the capacity is properly set in accordance with the generation amount of vapor, and the like. As the compression devices 31 and 41, a compressor in the narrow sense (the compression ratio is 2 or more) can be used. However, the compression device is not limited to the above compressor, and even a gas compression device classified into so-called a blower can be appropriately selected and used as long as one has proper properties as the above-described compression devices 31 and 41. Examples of the compressor include: a turbo compressor such as a centrifugal compressor and an axial compressor; and a capacity compressor such as a reciprocating compressor, a swash plate type compressor, a diaphragm compressor, a twin screw compressor, a single screw compressor, a scroll compressor, a rotary compressor, a rotary piston compressor, and a sliding-vane compressor. They have differences in properties such as the capacity, the compression ratio, and the degree of freedom of pressure control. Therefore, a proper compressor may be selected according to the capacity of a vapor generator to be configured, a supply requirement of vapor, and the like. The pumps 23 and 44 may be also appropriately selected from ones that can be ordinarily used for gas conveyance. The demisters 33 and 43 are formed of a material having resistance to the absorbing liquid, and there is no specific limitation as long as one can prevent particles of about 10 to 100 µm from passing through, and can suppress a decrease in performance and durability of the compression device. For example, a multilayered net, a fiber assembly, a porous body, and the like formed of a material such as corrosion-resistant metal and ceramics, etc. can be used.

An example of a method of regulating the circulation rate of the absorbing liquid in the recovery apparatus 1 will be described. An output of the pump 12 is controlled such that the absorbing liquid flows in a line 16 at a predetermined flow rate, and the degree of opening of the control valve 32 is adjusted so that a liquid surface level of the absorbing liquid A2 in the regeneration column 20 is maintained constant. Further, an output of the pump 23 is adjusted so that a liquid surface level in the tank 30 is maintained constant, and the degree of opening of the control valve 42 is adjusted so that a liquid surface level of the reservoir 50 is maintained constant. With these adjustments, the circulation rate of the absorbing liquid in the recovery apparatus 1 can be set to be a desired value.

The amount of steam generated from the absorbing liquid in the tanks 30 and 40 varies according to the pressure in the tanks 30 and 40 and the temperature of the absorbing liquid, and depends on a supply rate of the absorbing liquid. The supply rate of the absorbing liquid to the tank 30 corresponds to the circulation rate of the absorbing liquid in the recovery apparatus 1. Therefore, if the output of the pump 23 is adjusted so that the liquid surface level in the tank 30 is maintained constant, the generation amount of steam can be adjusted by regulating the pressure with the output of the compression device in accordance with the temperature of the absorbing liquid. The same may be applied to the supply rate of the absorbing liquid to the tank 40 in a case where all of the absorbing liquid in the reservoir 50 is supplied to the tank 40. Alternatively, a part of the absorbing liquid in the reservoir 50 may be supplied, and, in that case, it is not necessary to make the supply rate of the absorbing liquid to the tank 40 to correspond to the circulation rate of the absorbing liquid in the recovery apparatus 1, and the degree of opening of the control valve 42 is adjusted to regulate the supply rate of the absorbing liquid, so that the generation amount of vapor can be adjusted. When a part of the absorbing liquid in the reservoir 50 is supplied to the tank 40, it is favorable to configure the reservoir 50 in such a manner that an exceeding amount of liquid over a predetermined liquid level flows down to the lower portion, and the overflowing liquid drips dispersedly down to the filler-packed bed of the lower portion. The pressure of the steam to be supplied to the regeneration column 20 becomes equal to the pressure in the regeneration column 20.

The thermal energy of the absorbing liquid A2 that returns from the regeneration column 20 is recovered by the heat exchanger 24, and is supplied to the upper portion of the regeneration column 20. In the above-described configuration having the tanks 30 and 40, remaining heat of the absorbing liquid A2 and heat of reaction due to carbon dioxide absorption are recovered respectively by the tanks 30 and 40 as vaporization heat, and are supplied to the lower portion of the regeneration column 20, that is, to a downstream side of the absorbing liquid.

A recovery method implemented in the recovery apparatus 1 of FIG. 1 will be described.

In the absorption column 10, a gas G containing carbon dioxide such as a combustion exhaust gas, a process exhaust gas and the like is supplied from the bottom portion, and the absorbing liquid is supplied from the upper portion. The gas G and the absorbing liquid are then subjected to vapor-liquid contact on the filling materials 11a and 11b, and carbon dioxide is absorbed by the absorbing liquid while the temperature is increased by heat of reaction. Since carbon dioxide is well absorbed at a low temperature, it is favorable to give consideration to an inlet temperature of the absorbing liquid so as not to exceed 60° C. in view of generation of heat due to absorption of carbon dioxide. In a structure where the filling material is packed in upper and lower stages being formed integrally, the vicinity of the center tends to have the highest temperature. Therefore, such a structure is efficient that the absorbing liquid is taken outside from the reservoir 50 located between the upper and lower filling materials and is cooled in the steam supply system 22B as illustrated in FIG. 1. It is noted that the gas G supplied to the absorption column 10 can be also adjusted to have a proper temperature by providing a pretreatment for gas cooling as needed. However, it is desirable that the liquid temperature be 40° C. or more for the purpose of generating steam by heat recovery of the absorbing liquid and supplying the steam to the regeneration column. As the absorbing liquid, an aqueous liquid containing a compound having an affinity for carbon dioxide as an absorber is used. Examples of the absorber include alkanolamines, hindered amines having an alcoholic hydroxyl group, and cyclic amines, etc. More specifically, as alkanolamines, monoethanolamine, diethanolamine, triethanolamine, methyl diethanolamine, diisopropanolamine, and diglycolamine can be exemplified; as hindered amines having an alcoholic hydroxyl group, 2-amino-2-methyl-1-propanol (AMP), 2-(ethylamino)ethanol (EAE), and 2-(methylamino)ethanol (MAE); and as cyclic amines, piperazine, 2-methylpiperazine and the like can be exemplified. In general, monoethanolamine (MEA) is favorably used, and several types from the above examples may be mixed. The concentration of the absorber in the absorbing liquid can be properly set in accordance with an amount of carbon dioxide contained in the gas to be treated, a treatment speed, and the like. Considering fluidity and suppression of a consumption loss of the absorbing liquid, and the like, typically, the concentration of about 10 to 50 mass% is applied, and for example, an absorbing liquid having the concentration of about 30 mass% is favorably used for treatment of the gas G having the carbon dioxide content of about 20%. The supply rates of the gas G and the absorbing liquid are properly set so that the absorption can sufficiently progress, in accordance with the amount of carbon dioxide included in the gas, the vapor-liquid contact efficiency, and the like.

When the absorbing liquid A1 that has absorbed carbon dioxide is supplied to the regeneration column 20, the absorbing liquid A1 is heated to a high temperature in the vicinity of the boiling point. Here, it is noted that, since the absorbing liquid A1, before being supplied to the regeneration column 20, is subjected to heat exchange in the heat exchanger 24 with the absorbing liquid A2 that returns from the regeneration column 20, the absorbing liquid A1 has an increase in temperature close to the heating temperature in the regeneration column 20, and it is thus poured in the regeneration column 20 in a state where carbon dioxide can be easily released. In this embodiment, the absorbing liquid A1 is poured in the regeneration column 20 with about 70 to 120° C. Releasing of carbon dioxide is facilitated by the vapor-liquid contact on the filling material 21 as well as the absorbing liquid A2 is heated by the steam supplied to the lower portion of the regeneration column 20 to have a more increase in temperature, and the surface of the absorbing liquid A2 accumulated in the bottom portion of the regeneration column 20 is typically heated to about 90 to 130° C. Therefore, releasing of carbon dioxide progresses according to the heating by the steam and a temperature gradient, so that the absorbing liquid is regenerated. The temperature of the steam can be adjusted by outputs of the compression devices 31 and 41. Since the boiling point of the absorbing liquid A2 depends on its composition (the absorber concentration), the upper limit of the liquid temperature varies depending on the absorbing liquid in use.

When the absorbing liquid A2 regenerated in the regeneration column 20 is supplied to the tank 30 via the control valve 32 after being subjected to a temperature decrease to about 70° C. by the heat exchanger 24 (of a counter-flow type), the absorbing liquid A2 is depressurized to about 5 to 40 kPa, favorably, about 7 to 20 kPa. It is favorable to set the pressure in the regeneration column 20 to be about −50 to 120 kPaG, and more favorably, about −10 to 50 kPaG. In the configuration of the present invention, a low pressure of around the atmospheric pressure can be favorably applied as the pressure in the regeneration column 20. The pressure in the tank 30 can be adjusted with outputs of the compression device 31 and the pump 23, and by the decree of opening of the control valve 32. It is noted that the absorption column 10 may employ a depressurized state, a normal pressure state or a pressurized state, and can set any state as needed.

The steam generated in the tank 30 is pressurized by the compression device 31 and its pressure returns equal to that of the regeneration column 20, and the compression heat at this time causes an increase in temperature to be equal to or more than the boiling temperature under the pressure of the regeneration column. This high-temperature steam is supplied to the vicinity of the liquid surface of the absorbing liquid A2 in the regeneration column 20, and it increases the steam around there which is condensed in the regeneration column. With the condensation heat, the absorbing liquid is regenerated. Meanwhile, the absorbing liquid from which the steam is vaporized in the tank 30 causes to decrease in temperature to about 40 to 50° C., that is, around the boiling temperature. It is favorable to control the boiling temperature with an output from the compression device so that the liquid temperature becomes a predetermined inlet liquid temperature for the absorption column.

The absorbing liquid A2 of about 60° C. or less, which flows back to the absorption column 10, has an increase in temperature by the absorption reaction on the filling material 11a, and possibly becomes 60° C. or more. When this absorbing liquid is supplied to the tank 40 via the control valve 42, it loses vaporization heat by depressurization to about 5 to 40 kPa, favorably, about 7 to 20 kPa, and is then returned to the absorption column 10 with the temperature of 50° C. or around the boiling temperature. The steam of about 50° C. generated in the tank 40 is pressurized by the compression device 41 and is supplied to the regeneration column 20 with the pressure equal to the regeneration column 20. The temperature of the steam is increased by the compression heat to the boiling temperature or higher of the pressure of the regeneration column.

In this way, the absorbing liquid circulates between the absorption column 10 and the regeneration column 20, and the absorption step and the regeneration step are alternately repeated. The absorbing liquid A2 that returns from the regeneration column 20, after passing through the heat exchanger 24, has a further decrease in temperature in the tank 30, and the cooling temperature of the absorbing liquid can be controlled by the pressure in the tank 30. Therefore, it is easy to cool the absorbing liquid to around a temperature that is proper for the absorption column 10, and the absorbing liquid is poured in the absorption column 10 in a state where it can easily absorb carbon dioxide. It is noted that, though the absorbing liquid which returns from the tanks 30 and 40 to the absorption column 10 has lost moisture in the tanks 30 and 4C, it is not a significant amount. The concentration of the absorbing liquid that returns from the tank 40 to the lower portion of the absorption column 10 slightly increases. However, this is rather advantageous in absorption of carbon dioxide.

In the above-described configuration, thermal energy used for regeneration of the absorbing liquid in the regeneration column 20 is possibly obtained from recovery exchange heat by the heat exchanger 24, from recovery remaining heat and recovery reaction heat by the steam supply system, and from power energy consumed by driving of the compression device and the like. Therefore, the energy required for the recovering step of carbon dioxide in the present invention is possibly replaced from thermal energy supplied from the outside of the recovery apparatus to the power energy consumed by driving of the compression device, and the energy amount can be reduced.

One of the two steam generators of the steam supply system may not be provided. In this case, to efficiently perform regeneration of an absorbing liquid, a reboiler or the like can be suitably attached to the bottom portion of the regeneration column 20 in order to supplement the thermal energy of decreased recovery heat. Specifically, a steam heater is provided outside the regeneration column 20 in order to heat the absorbing liquid, and the absorbing liquid A2 in the bottom portion is circulated through a circulation passage so as to be heated by heat exchange with the steam heater.

Figure 2:
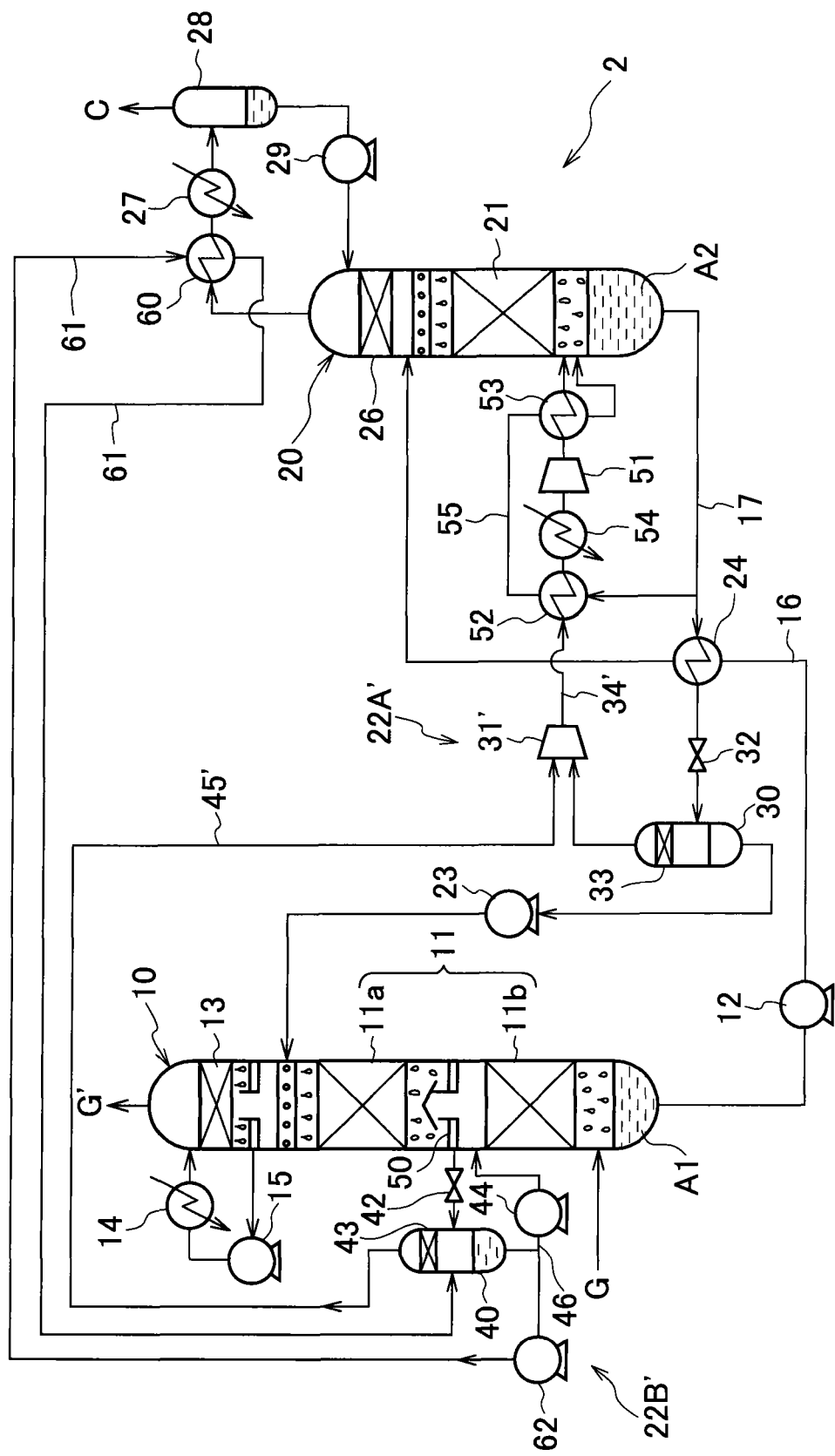
FIG. 2 is a schematic configuration diagram showing a recovery apparatus of carbon dioxide according to the second embodiment of the present invention.

FIG. 2 illustrates the second embodiment of the method of recovering carbon dioxide and the recovery apparatus implementing the method according to the present invention. This recovery apparatus 2 is configured to be an apparatus in which compression of steam generated in the two steam generators 22A' and 22B' of the steam supply system in the first embodiment is changed to be put together and performed in one route, and which is of a multistage-type that the compression step is performed stepwise with a plurality of compression devices arranged in series. Further, it is changed so that heat is also recovered from the recovery gas discharged from the regeneration column 20.

In detail, first, a top portion of a tank 40 and a compression device 31' are connected with a passage 45' so that steam generated in a tank 30 of a steam generator 22A' in the return passage 17 is compressed together with steam generated in the tank 40 of a steam generator 22B' attached to the absorption column 10, by a single compression device 31'. A compression device 51 for further compressing the steam after compressed by the compression device 31' is provided at a passage 34', and heat exchangers 52 and 53 for cooling the compressed high-temperature steam to some extent are disposed at the downstream sides of the compression devices 31' and 51, respectively. Further, a cooler 54 that cools the steam if cooling by the heat exchanger 52 is insufficient is attached as needed. The heat exchangers 52 and 53 are configured to exchange heat with the absorbing liquid in a passage 55 which is branched out from the return passage 17 and connected to the regeneration column 20. A part of the absorbing liquid A2 in the regeneration column 20 separates from the return passage 17, is subjected to heat exchange with the heat exchangers 52 and 53 in turn to be heated, and then returns to the regeneration column 20. Therefore, a part of the heat of steam is supplied to the absorbing liquid A2 in the regeneration column 20. In this embodiment, two-stage compression is performed. However, it may be configured to perform three-stage or more compression.

Moreover, there are provided a heat exchanger 60 for recovering heat of the recovery gas discharged from the regeneration column 20 with use of the absorbing liquid in the steam generator 22B', and a passage 61 and a pump 62 for supplying the absorbing liquid in the tank 40 to the heat exchanger 60. The passage 61 is branched out from a passage 46 that allows the absorbing liquid to flow from the bottom portion of the tank 40 and return to the absorption column 10, and is connected via the heat exchanger 60 to the middle portion of the tank 40. Therefore, a part of the absorbing liquid in the tank 40 is separated from the passage 46 to flow the passage 61 by the pump 62, and it cools the recovery gas from the regeneration column 20 in the heat exchanger 60 while it increases in temperature or is partially turned into vapor before flowing back to the tank 40. Accordingly, a cooler 27 can be mainly used for enhancing the reliability of moisture condensation.

For example, the steam having the pressure of about 7 to 20 kPa in the tanks 30 and 40 has an increase in temperature to about 200° C. in the compression device 31'. The steam is subjected to heat exchange in the exchanger 52 with the absorbing liquid A2 flowed from the regeneration column 20 of about 90 to 130° C., and the temperature is decreased to a temperature that is higher by about 5 to 20° C. than the absorbing liquid A2. The steam is possibly cooled to 100° C. or less by the cooler 54 as needed. Further, the temperature of the steam is raised again to about 200° C. by the compression device 51, is decreased by the heat exchanger 53 to a temperature higher by about 5 to 20° C. than the absorbing liquid A2 as needed, and it is supplied to the registration column 20 with a pressure equal to the regeneration column 20.

The absorbing liquid of about 60° C. or less, which flows back to the absorption column 10, has an increase in temperature by the absorption reaction, and, when supplied to the tank 40 via the control valve 42, the absorbing liquid is depressurized to a pressure of about 7 to 20 kPa. Then a part of the absorbing liquid is supplied to the heat exchanger 60 with the temperature of about 60° C. or less, and the rest of the absorbing liquid is returned to the absorption column 10. The recovery gas of about 60 to 100° C. discharged from the regeneration column 20 is cooled to 50° C. or less through the heat exchanger 60 and the cooler 27, while the absorbing liquid of about 60° C. or less flowing separately from the tank 40 passes through the heat exchanger 60 before returning to the tank 40.

In a case of configuring such that the compression of the steam is performed stepwise, it is possible to add a function to prevent overheat by decreasing the steam temperature and a function to increase the temperature of the absorbing liquid in the regeneration column 20, and therefore, the temperature adjustment of the steam to be supplied to the regeneration column and the recovery/reuse of steam heat are facilitated. Further, such a configuration is also useful when a compression device having relatively low heat resistance is used or when it is necessary to depressurize the tank to a lower pressure in order to supply steam in a desired state. Furthermore, when the compression is performed in multi stages, the total of electric power consumed by the compression device is smaller than that in a case where the same compression is performed in a single stage. Therefore, its energy efficiency is improved.

In the recovery apparatus 2 of FIG. 2, conditions required for the elements such as the compression device that configure the recovery apparatus 2 are similar to those in the apparatus 1 of FIG. 1, and the recovery apparatus 2 is configured in a similar manner to the recovery apparatus 1 of FIG. 1 other than the above-described point. Therefore, its description will not be repeated.

In the present invention, a part of the configuration of the recovery apparatus 2 of FIG. 2 may be incorporated into the recovery apparatus 1 of FIG. 1, and for example, at least one of the steam generators 22A and 22B of FIG. 1 may be configured to the multistage-compression type using a plurality of compression devices, or may be configured such that the steam generated in the steam generators 22A and 22B is pressurized in a single compression device together. Also, the steam generator 22B can be configured such that recovery heat from the recovery gas discharged from the regeneration column 20 is used.

Here, it is noted that, in the above-described configuration, it is also possible to modify the generation of steam by each of the steam generators 22A, 22A', 22B, and 22B' to be performed in multiple stages. For example, the generation and compression in two stages is possible in such a configuration that the absorbing liquid discharged after steam generation by a tank of the first stage is introduced to a tank of the second stage via a control valve, and that the steam generated in the tank of the second stage is pressurized by a compression device of the second stage and is then pressurized together with the steam from the tank of the first stage by a compression device of the first stage. A configuration of three stages or more is also possible in a similar manner. Moreover, the absorption column and the regeneration column in the embodiments of the present invention, which are described above as packed columns provided with a filling material, may also be changed to have one of other systems that include a tray column provided with a plurality of trays to increase the contact area.

The energy necessary for recovery of carbon dioxide is namely thermal energy required for regeneration of the absorbing liquid that has absorbed carbon dioxide (releasing of carbon dioxide). According to its calculation performed through simulation in order to evaluate the difference between presence and absence of supply of steam to the absorbing liquid to be regenerated, the regeneration heat is about 3.9 GJ/t-$CO_2$ where the absorbing liquid is a 30 mass % MEA solution. In the present invention, as a part of this regeneration heat, the recovery heat included in the steam is used, and energy supplied from the outside (driving energy such as a compression device and the like) can be further reduced. According to a similar simulation performed in the recovery apparatus of FIG. 2, all of the thermal energy to be supplied from the outside of the recovery apparatus can be replaced with electric energy that drives the compression device and the like, and the electric energy is about 1.1 GJ/t-$CO_2$.

INDUSTRIAL APPLICABILITY

The present invention can be used in treatment of a gas containing carbon dioxide discharged from facilities such as a thermal power station, an ironworks, and a boiler, and is useful in reduction of carbon dioxide emissions and damage to the environment. A recovery apparatus of carbon dioxide capable of reducing the cost required for treatment of recovering carbon dioxide, and contributing to the energy saving and the environmental protection is possibly provided.

The invention claimed is:

1. A recovery apparatus of carbon dioxide comprising:
   an absorption column configured to bring a gas containing carbon dioxide into contact with an absorbing liquid and to allow the absorbing liquid to absorb carbon dioxide;
   a regeneration column for regenerating the absorbing liquid, configured to cause the absorbing liquid having carbon dioxide absorbed in the absorption column to release carbon dioxide by heat;
   a circulation system configured to circulate the absorbing liquid in such a manner that the absorbing liquid flows from the absorption column and returns to the absorption column through the regeneration column, the circulation system comprising a heat a exchanger configured to perform heat exchange between the absorbing liquid supplied from the absorption column to the regeneration column and the absorbing liquid that returns from the regeneration column to the absorption column thereby the absorbing liquid supplied from the absorption column is heated and the obsorbing liquid that returns from the regeneration column is cooled; and
   a steam supply system configured to supply to the regeneration column steam available for a heat source that regenerates the absorbing liquid, the steam supply system comprising: a steam generator configured to generate steam, using the absorbing liquid that has passed heat exchange by the heat exchanger and returns to the absorption column by the circulation system; and a compression device configured to compress the generated steam to raise a temperature of the steam to be higher than a regeneration temperature of the absorbing liquid.

2. The recovery apparatus of carbon dioxide according to claim 1, wherein the steam supply system further comprises a second steam generator configured to generate the steam from the absorbing liquid in the absorption column.

3. The recovery apparatus of carbon dioxide according to claim 1, wherein the steam generator comprises a tank configured to depressurize the absorbing liquid to generate steam, and the absorbing liquid is decreased in a temperature by the generation of the steam in the tank.

4. The recovery apparatus of carbon dioxide according to claim 2, wherein the steam supply system comprises two tanks configured to generate steam from each of the absorbing liquid that returns to the absorption column and the absorbing liquid in the absorption column, and the compression device is configured to compress both of the steam generated in the two tanks together.

5. The recovery apparatus of carbon dioxide according to claim 3, configured to include a plurality of the compression devices and to compress the steam stepwise.

6. The recovery apparatus of carbon dioxide according to claim 3, further comprising a heat exchanger for supplying a part of a quantity of heat of the steam that is raised in temperature by the compression device, to the absorbing liquid in the regeneration column by heat exchange with the absorbing liquid in the regeneration column.

7. The recovery apparatus of carbon dioxide according to claim 1, wherein the absorbing liquid includes an amine absorbent.

8. A method of recovering carbon dioxide, comprising:
   an absorption step of bringing a gas containing carbon dioxide into contact with an absorbing liquid and causing the absorbing liquid to absorb carbon dioxide;
   a regeneration step of causing the absorbing liquid having carbon dioxide absorbed in the absorption step to release carbon dioxide by heat, to regenerate the absorbing liquid;
   a circulation step of circulating the absorbing liquid in such a manner that the absorbing liquid of the absorption step returns through the regeneration step to the absorption step, the circulation step comprising a heat-exchange step of performing heat exchange between the absorbing liquid supplied from the absorbation step to the regeneration step and the absorbing liquid that returns from he regeneration step to the absorption step, thereby the absorbing liquid supplied from the absorption step is heated and the absorbing liquid that returns from the regeneration step is cooled; and
   a steam-supply step of supplying to the regeneration step steam available for a heat source that regenerates the absorbing liquid, the steam-supply step comprising: a steam generation step of generating steam with use of the absorbing liquid that has passed the heat exchange in the heat-exchange step and returns to the absorption step by the circulation step and the absorbing liquid in the absorption step; and a compression step of compressing the generated steam to raise a temperature of the steam to be higher than a regeneration temperature of the absorbing liquid.

9. The method of recovering carbon dioxide according to claim 8, wherein the steam-supply step further comprises a second steam generation step of generating the steam from the absorbing liquid in the absorption step.

10. The method of recovering carbon dioxide according to claim 8, wherein the steam generation step comprises a depressurization step of depressurizing the absorbing liquid to generate steam, and the generation of the steam in the depressurization step causes decrease in a temperature of the absorbing liquid.

11. The method recovering carbon dioxide according to claim 9, wherein the steam-supply step comprises two depressurization steps of generating, respectively, steam from each of the absorbing liquid that returns to the absorption step and the absorbing liquid in the absorption step, and the compression step comprises compressing both of the steam generated in the two depressurization steps together.

12. The method of recovering carbon dioxide according to claim 10, which comprises a plurality of the compression steps that the steam is compressed stepwise.

13. The method of recovering carbon dioxide according to claim 10, further comprising a heat-exchange step of supplying a part of a quantity of heat of the steam that is raised in a temperature by the compression step, to the absorbing liquid in the regeneration step by heat exchange with the absorbing liquid in the regeneration step.

14. The method of recovering carbon dioxide according to claim 8, wherein the absorbing liquid includes an amine absorbent.

* * * * *